(12) United States Patent
Barsness et al.

(10) Patent No.: US 8,516,494 B2
(45) Date of Patent: Aug. 20, 2013

(54) EXECUTING AN APPLICATION ON A PARALLEL COMPUTER

(75) Inventors: Eric L. Barsness, Pine Island, MN (US); Michael B. Brutman, Rochester, MN (US); David L. Darrington, Rochester, MN (US); Amanda E. Peters, Rochester, MN (US); John M. Santousso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 12/140,023

(22) Filed: Jun. 16, 2008

(65) Prior Publication Data

US 2009/0313636 A1 Dec. 17, 2009

(51) Int. Cl.
*G06F 9/46* (2006.01)

(52) U.S. Cl.
USPC ........... 718/106; 718/100; 718/101; 718/102; 718/103; 718/104; 718/105; 718/107

(58) Field of Classification Search
None
See application file for complete search history.

(56) References Cited

U.S. PATENT DOCUMENTS

| 5,978,830 | A | 11/1999 | Nakaya et al. |
| 6,842,759 | B2 | 1/2005 | Hagger et al. |
| 7,568,190 | B2 | 7/2009 | Creamer et al. |
| 7,703,089 | B2 | 4/2010 | Birenheide |
| 2003/0120776 | A1 | 6/2003 | Avvari et al. |
| 2004/0154016 | A1 | 8/2004 | Randall |
| 2005/0005200 | A1 | 1/2005 | Matena et al. |
| 2006/0085785 | A1 | 4/2006 | Garrett |
| 2006/0150190 | A1* | 7/2006 | Gusler et al. ................. 718/105 |
| 2006/0195559 | A1* | 8/2006 | Winter et al. ................. 709/223 |
| 2006/0271395 | A1 | 11/2006 | Harris et al. |
| 2007/0130566 | A1 | 6/2007 | Van Rietschote et al. |
| 2008/0034365 | A1 | 2/2008 | Dahlestedt |
| 2008/0209434 | A1* | 8/2008 | Queck et al. ................. 718/105 |
| 2008/0288746 | A1 | 11/2008 | Inglett et al. |
| 2009/0067334 | A1 | 3/2009 | Archer et al. |
| 2009/0119481 | A1 | 5/2009 | Vishkin |
| 2009/0172623 | A1* | 7/2009 | Cross et al. ................. 716/9 |
| 2009/0240930 | A1 | 9/2009 | Barness et al. |

OTHER PUBLICATIONS

U.S. Appl. No. 12/053,685, filed Mar. 24, 2008, Eric L. Barsness.
U.S. Appl. No. 12/109,259, filed Apr. 28, 2008, Eric Barness.
U.S. Appl. No. 12/109,267, filed Apr. 24, 2008, Barness et al.
U.S. Appl. No. 12/140,023, filed Jun. 16, 2008, Eric Barness.

(Continued)

*Primary Examiner* — Emerson Puente
*Assistant Examiner* — Jonathan R Labud
(74) *Attorney, Agent, or Firm* — Biggers & Ohanian LLP

(57) ABSTRACT

Methods, apparatus, and products are disclosed for executing an application on a parallel computer that include: executing, by a current compute node, a current task of the application, including producing results; determining, by the current compute node in dependence upon current network characteristics and application characteristics, whether to transfer the results to a next compute node for further processing by a next task on the next compute node or to execute the next task for further processing of the results on the current compute node; transferring, by the current compute node, the results to the next compute node for further processing by the next task on the next compute node if the determination specifies transferring the results to the next node; and executing, by the current compute node, the next task for further processing of the results if the determination specifies executing the next task on the current compute node.

18 Claims, 6 Drawing Sheets

(56) References Cited

OTHER PUBLICATIONS

U.S. Appl. No. 12/109,248, filed Apr. 24, 2008, Eric Barness.
U.S. Appl. No. 12/109,238, filed Apr. 30, 2008, Eric Barness.
Bokhari, "Partitioning Problems in Parallel, Pipelined, and Distributed Computing", Jan. '988, IEEE Transactions on Computers, vol. 37, No. 1.
Gibbons, Richard. "A Historical Application Profiler for Use by Parallel Schedulers" IPPS '97 Proceedings of the Job Scheduling Strategies for Parallel Processing. pp. 58-77.
Wenzhang Zhu, Cho-Li Wang and Francis C.M. Lau. "Lightweight Transparent Java Thread Migration for Distributed JVM" International Conference on Parallel Processing, 2003, pp. 465-472.
Office Action, U.S. Appl. No. 12/053,685, mail date Jul. 20, 2011.
Final Office Action, U.S. Appl. No. 12/053,685, mail date Jan. 12, 2012.
Office Action, U.S. Appl. No. 12/109,259, mail date Aug. 4, 2011.
Notice of Allowance, U.S. Appl. No. 12/109,259, mail date Dec. 13, 2011.
Office Action, U.S. Appl. No. 12/109,267, mail date Jul. 28, 2011.
Notice of Allowance, U.S. Appl. No. 12/109,267, mail date Jan. 20, 2012.
Office Action, U.S. Appl. No. 12/140,023, mail date Mar. 12, 2012.
Office Action, U.S. Appl. No. 12/109,248, mail date Oct. 14, 2011.
Office Action, U.S. Appl. No. 12/109,238, Jul. 19, 2011.
Final Office Action, U.S. Appl. No. 12/109,238, mail date Nov. 17, 2011.
Bokhari, "Dual processor scheduling with dynamic reassignment," IEEE Trans. Software Eng., vol. SE-5, pp. 341-349, Jul. 1979.
Advisory Action, U.S. Appl. No. 12/053,685, mail date Mar. 21, 2012.
RCE, U.S. Appl. No. 12/053,685, mail date Apr. 5, 2012.
Office Action, U.S. Appl. No. 12/053,685, mail date Feb. 21, 2013.
Office Action, U.S. Appl. No. 12/140,023, mail date Mar. 1, 2012.
Final Office Action, U.S. Appl. No. 12/140,023, mail date Jun. 22, 2012.
Advisory Action, U.S. Appl. No. 12/140,023, mail date Sep. 19, 2012.
Office Action, U.S. Appl. No. 13/440,065, mail date Aug. 23, 2012.
Final Office Action, U.S. Appl. No. 13/440,065, mail date Feb. 22, 2013.
Office Action, U.S. Appl. No. 13/443,606, mail date Sep. 7, 2012.

\* cited by examiner

EXECUTING AN APPLICATION ON A PARALLEL COMPUTER

BACKGROUND OF THE INVENTION

1. Field of the Invention

The field of the invention is data processing, or, more specifically, methods, apparatus, and products for executing an application on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm. Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

Many applications that execute in these parallel computing systems are each composed of a plurality of individual, reusable software components. These software components may operate together for both parallel processing and serial processing of data. For an example, a facial recognition software application may be composed of one reusable software component that performs image preprocessing, two reusable software components that each performs in parallel face position detection within the processed image, still another reusable software component that measures facial features, and so on.

SUMMARY OF THE INVENTION

Methods, apparatus, and products are disclosed for executing an application on a parallel computer. The parallel computer includes a plurality of compute nodes connected together through a data communications network. The application is carried out by a plurality of tasks. Executing an application on a parallel computer includes: executing, by a current compute node, a current task of the application, including producing results; determining, by the current compute node in dependence upon current network characteristics and application characteristics, whether to transfer the results to a next compute node for further processing by a next task on the next compute node or to execute the next task for further processing of the results on the current compute node; transferring, by the current compute node, the results to the next compute node for further processing by the next task on the next compute node if the determination specifies transferring the results to the next compute node; and executing, by the current compute node, the next task for further processing of the results if the determination specifies executing the next task on the current compute node.

The foregoing and other objects, features and advantages of the invention will be apparent from the following more particular descriptions of exemplary embodiments of the invention as illustrated in the accompanying drawings

DETAILED DESCRIPTION OF EXEMPLARY EMBODIMENTS

Figure 1:
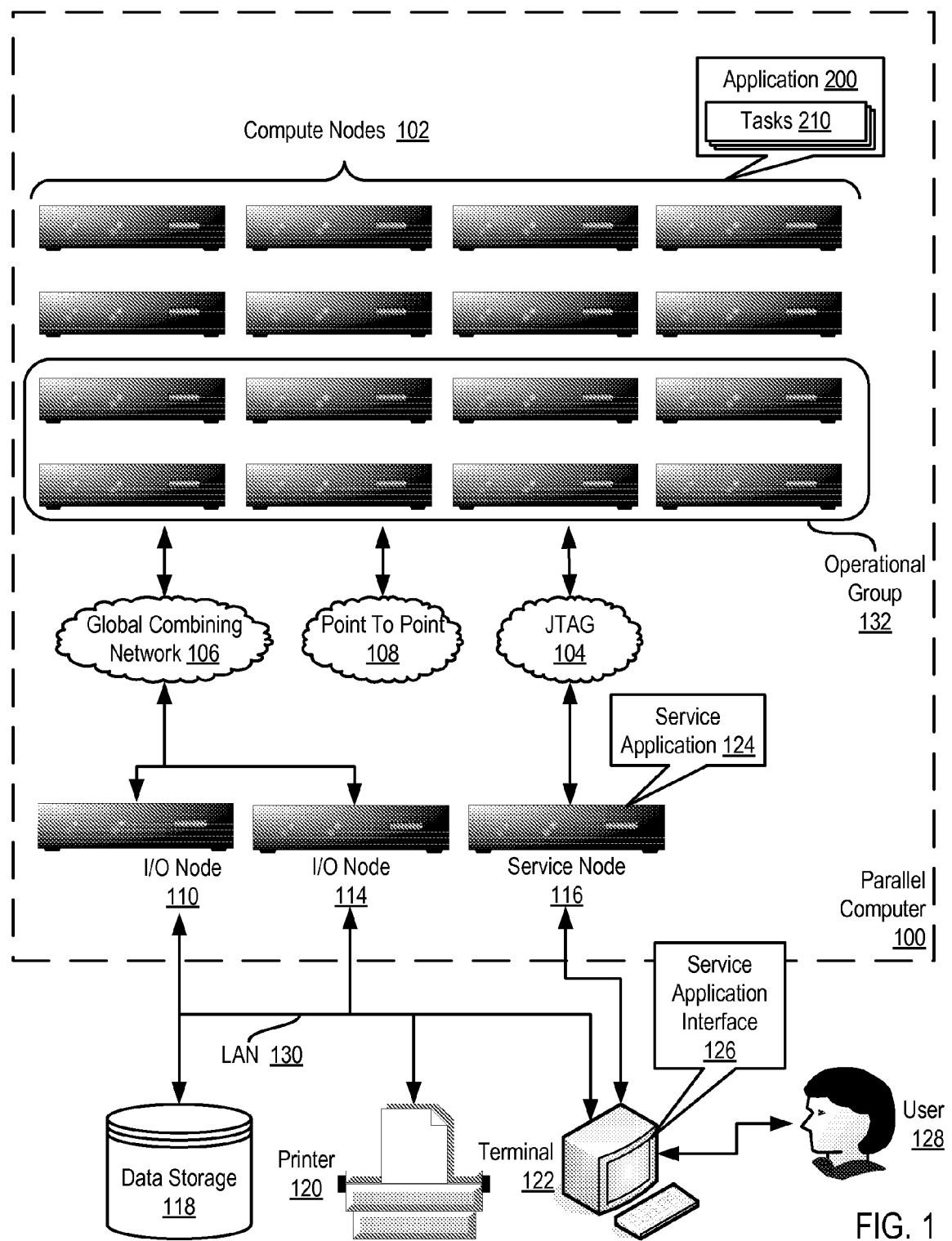
FIG. 1 illustrates an exemplary system for executing an application on a parallel computer according to embodiments of the present invention.

Exemplary methods, apparatus, and computer program products for executing an application on a parallel computer according to embodiments of the present invention are described with reference to the accompanying drawings, beginning with FIG. 1. FIG. 1 illustrates an exemplary system for executing an application on a parallel computer (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

In the example of FIG. 1, the compute nodes (102) operate to execute an application (200) that is carried out using a plurality tasks (210). A task is a software module, specifically a set of computer program instructions, that when executed performs a particular job that is a logical, discrete, reusable building block for more complex software systems. That is, a software developer may create a task to perform a specific job within broader software systems that the software developer can reuse from one system to another. The tasks may process application data serially, in parallel, or both. In addition, such tasks may be reconfigured during execution to accommodate changes in the execution environment or user preferences. Readers will note that the tasks (210) may be written in any number of programming languages such as, for example, C++, C, Java, FORTRAN, and so on.

For an example of how tasks may operate together to perform an application, consider a facial recognition software application that operates as follows: An image selection task receives various images as application input and selects a particular image for performing facial recognition. The image selection task provides the selected image to a preprocessing task, which cleans up the image by removing visual noise attributable to the camera capturing the image or other visual noise or aberrations. The preprocessing task provides the preprocessed image to a face detection task that identifies a person's face within the image. The face detection task in turn provides the image and the location of the face in the image to an alignment task that determines the head's position, size, and pose. The alignment task then provides the image and the alignment data to a measurement task that measures the curves of the face on a sub-millimeter or microwave scale and creates a template that describes the features of the face in the image. A representation task receives the template from the measure task and translates the template into a set of codes that represent the features of the face in the image. The representation task then provides the set of codes to a matching task that compares the set of codes with codes representing faces of known persons in a database to identify a match. When performing identity verification, a candidate verification/identification task receives an identifier for a matching face in the database and compares information associated with the matched face in the database with information provided by the person whose face is captured for facial recognition. When performing identification, the candidate verification/identification task receives an identifier for a matching face in the database and provides system administrators with the information associated with the matched face in the database. The candidate verification/identification task then provides the verification/identification information as application output.

The execution configuration for the tasks (210) may change during or between periods in which the tasks (210) are executed on the compute nodes (102). In the example of FIG. 1, each task (210) may be executed on a different compute node (102). In some configurations, however, compute nodes (102) may support multiple tasks (210). During execution, the compute nodes may move a task (210) from one compute node (102) to another, or multiple tasks (210) may be collapsed for execution on one compute node (102) from multiple compute nodes (102). The compute nodes may move a task (210) from one node to another by transferring the executable version of the task (210) along with processing state information such as memory contents, cache contents, processor registers, data, and so on from one compute node to another.

As mentioned above, the tasks may process application data serially, in parallel, or both. A task currently processing data on a compute node is generally referred to as a 'current task,' and the task designated for processing data produced by the current task is generally referred to as the 'next task.' Similarly, the compute node on which the current task is currently deployed is generally referred to as the 'current compute node,' while the compute node on which the next task was initially deployed is generally referred to as the 'next compute node.'

In the example of FIG. 1, the current compute node includes a set of computer program instructions that generally operate to execute an application on the parallel computer (100) according to embodiments of the present invention. In some embodiments, the computer program instructions that operate to execute an application on the parallel computer (100) according to embodiments of the present invention may be included in the computer program instructions that make up the current task. In some other embodiments, the computer program instructions that operate to execute an application on the parallel computer (100) according to embodiments of the present invention may be included in a separate software module from the current task such as, for example, a Java Virtual Machine ('JVM'), the operating system, or some other task execution environment.

In the example of FIG. 1, the current compute node generally operates to execute an application on the parallel computer (100) according to embodiments of the present invention by: executing a current task of the application, including producing results; determining, in dependence upon current network characteristics and application characteristics, whether to transfer the results to a next compute node for further processing by a next task on the next compute node or to execute the next task for further processing of the results on the current compute node; transferring the results to the next compute node for further processing by the next task on the next compute node if the determination specifies transferring the results to the next compute node; and executing the next task for further processing of the results if the determination specifies executing the next task on the current compute node. Executing the application (200) according to embodiments of the present invention advantageously enhances overall execution performance for the application (200) because executing the application (200) in such a manner provides the option of moving either the data produced by the current task or the next task itself through the network to reduce overall processing and network inefficiencies.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although executing an application on a parallel computer according to embodiments of the present invention is described above in terms of an architecture for a parallel computer, readers will note that such an embodiment is for explanation only and not for limitation. In fact, executing an application on a parallel computer according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of executing an application on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of executing an application on a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Executing an application on a parallel computer according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of executing an application according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152).

Figure 2:
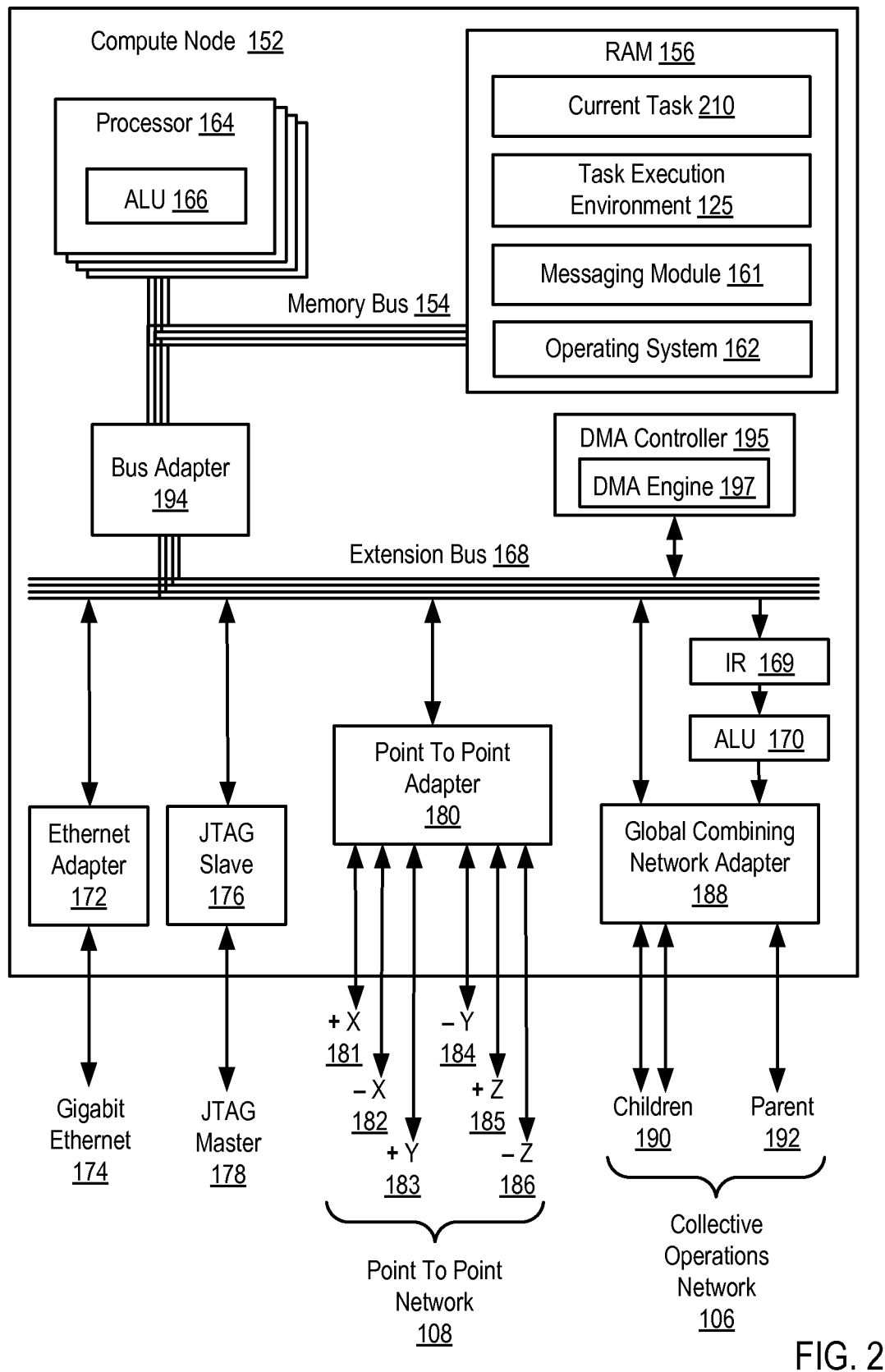
FIG. 2 sets forth a block diagram of an exemplary compute node useful in a parallel computer capable of executing an application according to embodiments of the present invention.

Stored in RAM (156) of FIG. 2 is a current task (210). The current task (210) of FIG. 2 combines with other tasks on other compute nodes to carry out a particular application. As mentioned above, a task is a set of computer program instructions that when executed perform a particular job that is a logical, discrete, reusable building block for more complex software systems.

Also stored in RAM (156) of FIG. 2 is a task execution environment (125). The task execution environment (125) of FIG. 2 includes a set of computer program instructions that support execution of the tasks of the application and are capable of executing an application on a parallel computer according to embodiments of the present invention. The task execution environment (125) operates generally for executing an application on a parallel computer according to embodiments of the present invention by: executing a current task of the application, including producing results; determining, in dependence upon current network characteristics and application characteristics, whether to transfer the results to a next compute node for further processing by a next task on the next compute node or to execute the next task for further processing of the results on the current compute node; transferring the results to the next compute node for further processing by the next task on the next compute node if the determination specifies transferring the results to the next compute node; and executing the next task for further processing of the results if the determination specifies executing the next task on the current compute node. An example of a task execution environment may include a Java Virtual Machine.

Also stored RAM (156) is a messaging module (161), a library of computer program instructions that carry out parallel communications among compute nodes, including point to point operations as well as collective operations. User-level applications such as tasks (210) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for executing an application on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in executing an application on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
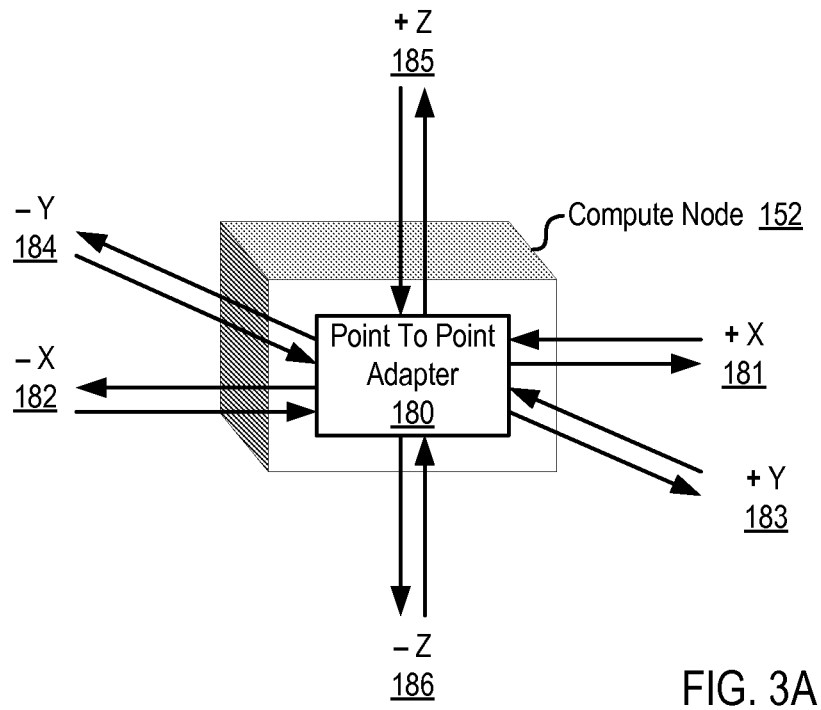
FIG. 3A illustrates an exemplary Point To Point Adapter useful in systems capable of executing an application on a parallel computer according to embodiments of the present invention.

For further explanation, FIG. 3A illustrates an exemplary Point To Point Adapter (180) useful in systems capable of executing an application on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
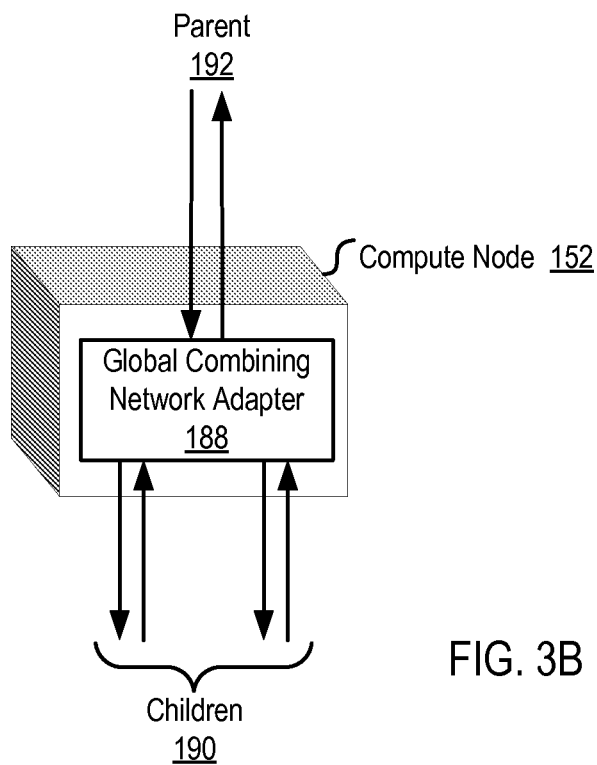
FIG. 3B illustrates an exemplary Global Combining Network Adapter useful in systems capable of executing an application on a parallel computer according to embodiments of the present invention.

For further explanation, FIG. 3B illustrates an exemplary Global Combining Network Adapter (188) useful in systems capable of executing an application on a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
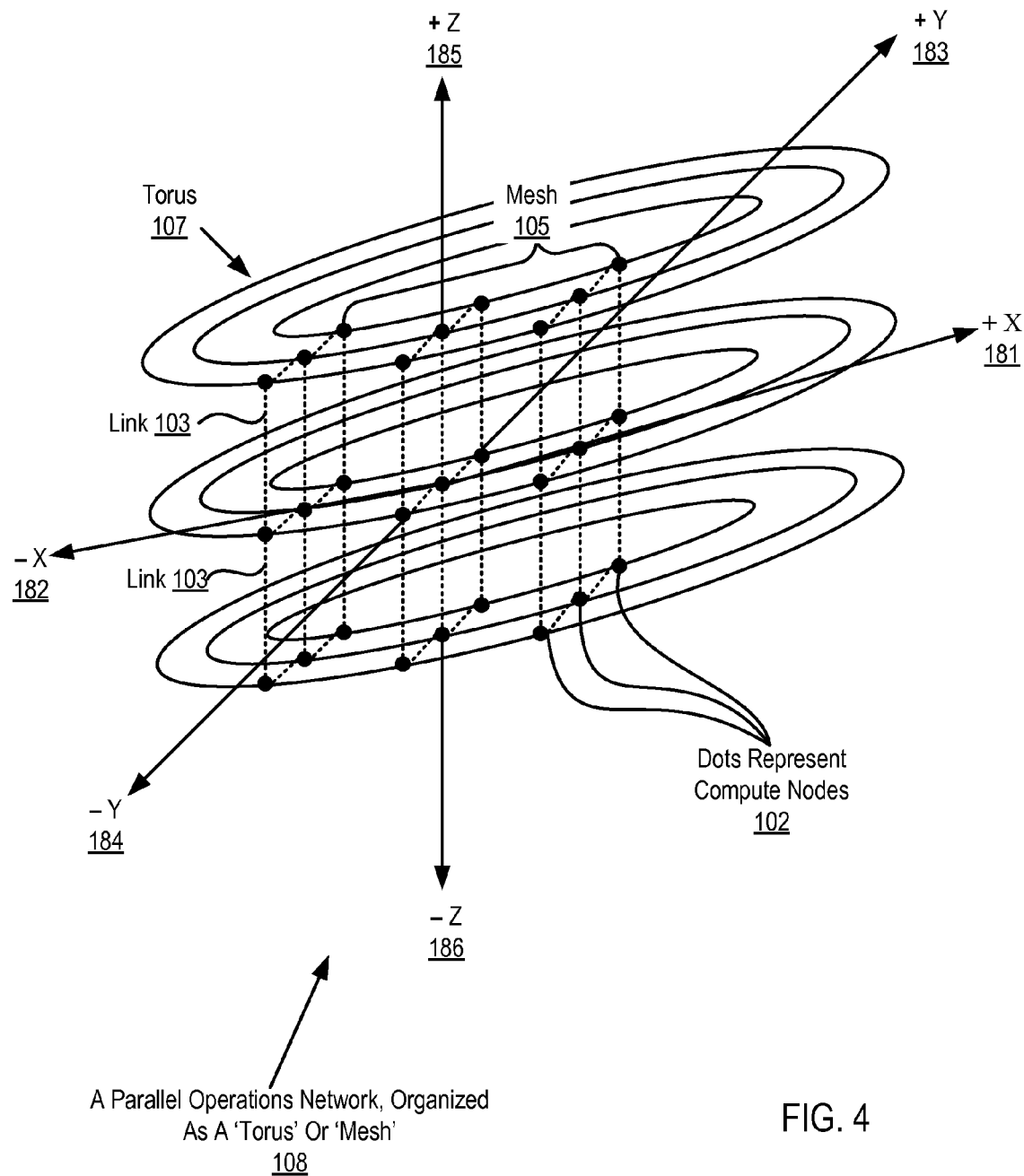
FIG. 4 sets forth a line drawing illustrating an exemplary data communications network optimized for point to point operations useful in systems capable of executing an application on a parallel computer in accordance with embodiments of the present invention.

For further explanation, FIG. 4 sets forth a line drawing illustrating an exemplary data communications network (108) optimized for point to point operations useful in systems capable of executing an application on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in executing an application on a parallel computer in accordance with embodiments of the present invention may contain only a few compute nodes or may contain thousands of compute nodes.

Figure 5:
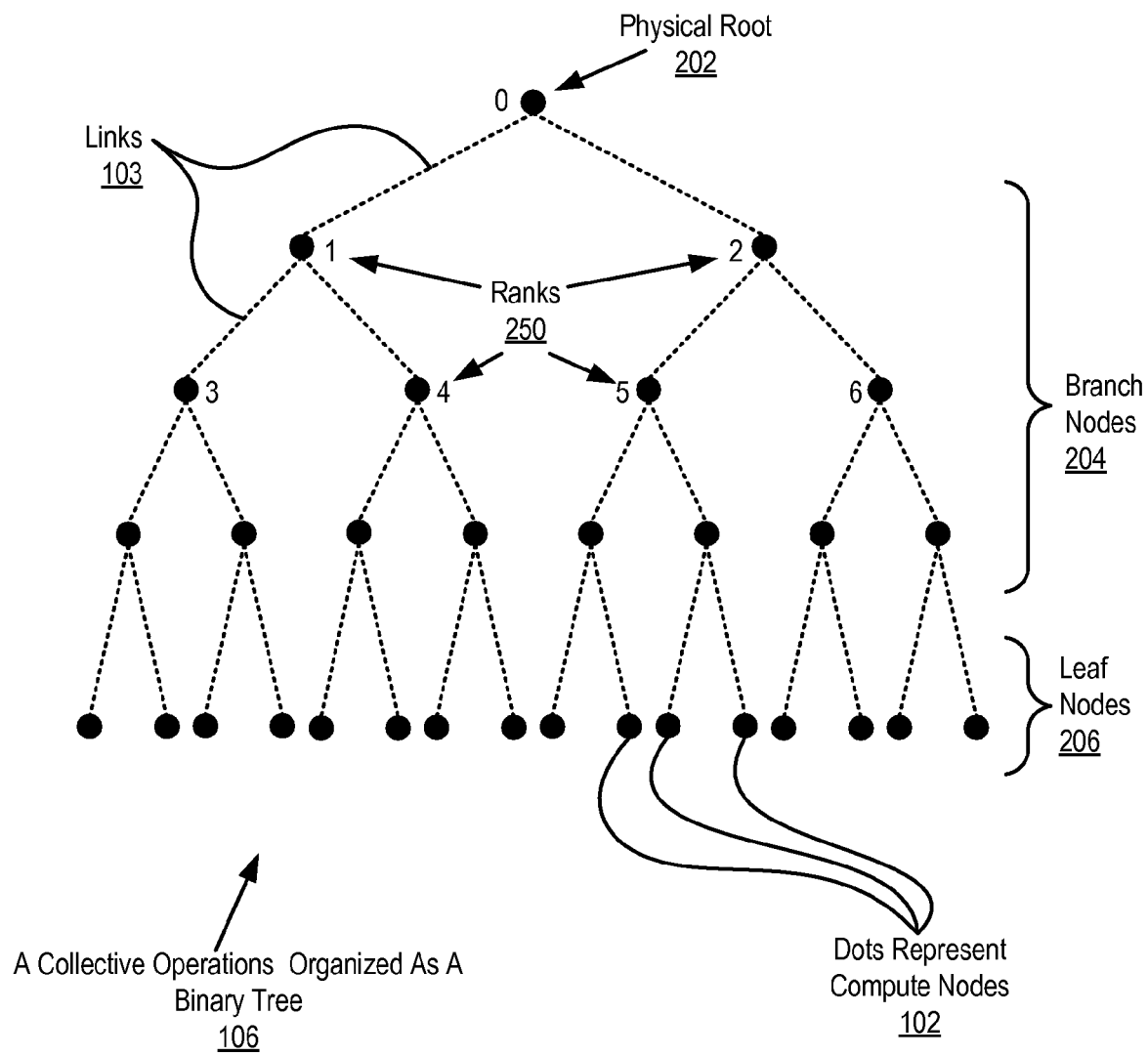
FIG. 5 sets forth a line drawing illustrating an exemplary data communications network optimized for collective operations useful in systems capable of executing an application on a parallel computer in accordance with embodiments of the present invention.

For further explanation, FIG. 5 sets forth a line drawing illustrating an exemplary data communications network (106) optimized for collective operations useful in systems capable of executing an application on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for executing an application on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
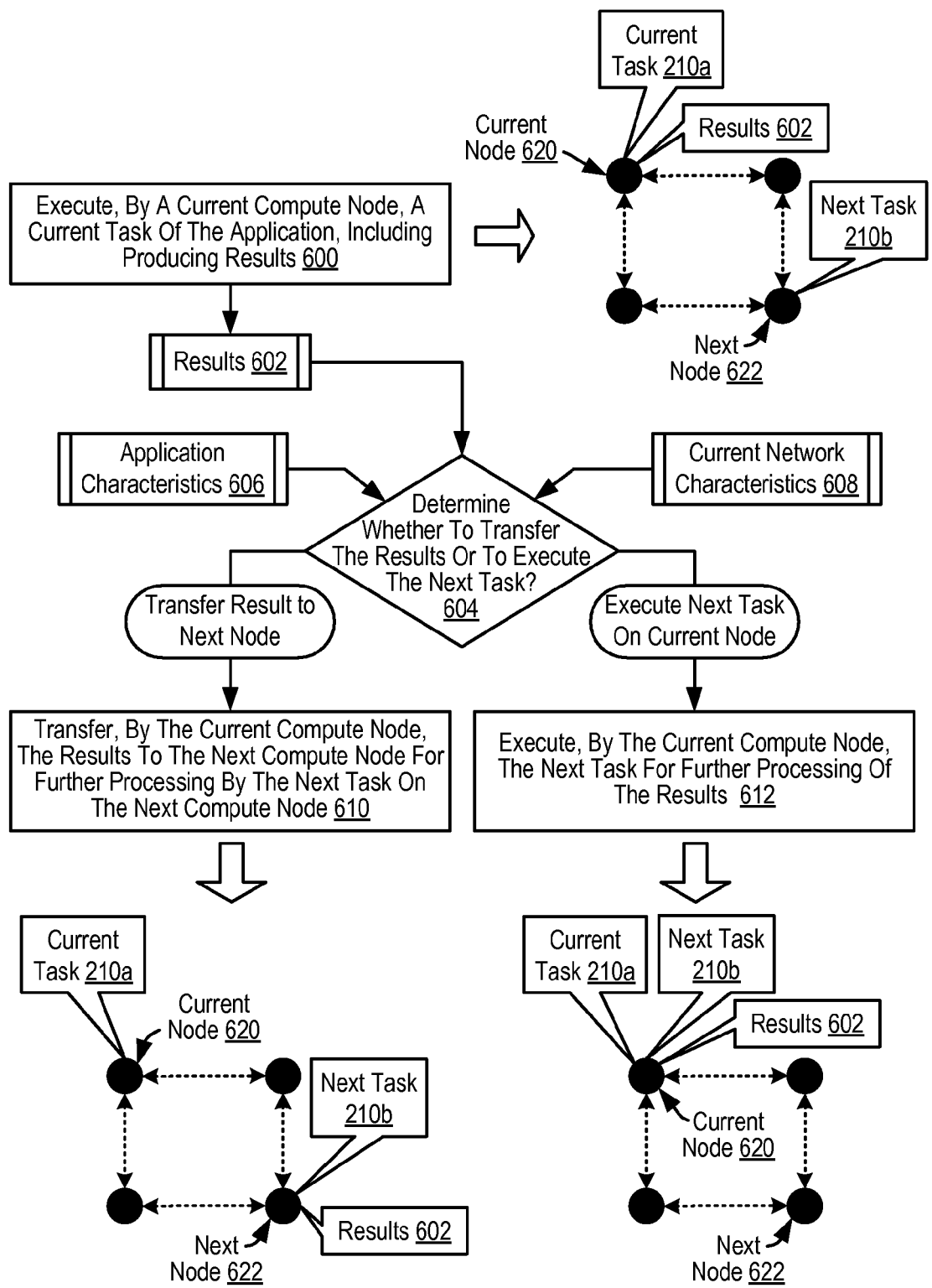
FIG. 6 sets forth a flow chart illustrating an exemplary method for executing an application on a parallel computer according to embodiments of the present invention.

For further explanation, FIG. 6 sets forth a flow chart illustrating an exemplary method for executing an application on a parallel computer according to embodiments of the present invention. The parallel computer described with referenced to FIG. 6 includes a plurality of compute nodes connected together through a data communications network. The application described with reference to FIG. 6 is carried out by a plurality of tasks. FIG. 6 illustrates four compute nodes as solid black circles and the network connecting the compute nodes together as dotted double arrows.

A task currently processing data on a compute node is generally referred to as a 'current task,' and the task designated for processing data produced by the current task is generally referred to as the 'next task.' Similarly, the compute node on which the current task is currently deployed is generally referred to as the 'current compute node,' while the compute node on which the next task was initially deployed is generally referred to as the 'next compute node.'

The method of FIG. 6 includes executing (600), by a current compute node (620), a current task (210a) of the application, including producing results (602). The current compute node (620) may execute (600) the current task (210*a*) of the application according to the method of FIG. 6 by scheduling the computer program instructions making up the current task (210) for execution on one or more of the processors for the current compute node (620). The results (602) of FIG. 6 represent the data output produced from the execution of the current task (210*a*) on the current compute node (620). After the results (602) of FIG. 6 are produced, the current compute node (620) typically stores the results (602) in computer memory for the current compute node (620).

The method of FIG. 6 also includes determining (604), by the current compute node (620) in dependence upon current network characteristics (608) and application characteristics (606), whether to transfer the results (602) to a next compute node (622) for further processing by a next task (210*b*) on the next compute node (622) or to execute the next task (210*b*) for further processing of the results (602) on the current compute node (620). The current compute node (620) may determine (604) whether to transfer the results (602) to a next compute node (622) or to execute the next task (210*b*) on the current compute node (620) according to the method of FIG. 6 by comparing the current network characteristics (608) and the application characteristics (606) to a determination ruleset that associates determinations of whether to transfer the results (602) to the next node (622) or execute the next task (210*b*) on the current node (620) with various combinations of values for the current network characteristics (608) and the application characteristics (606).

For example, the determination ruleset may associate a determination to transfer the results (602) to the next compute node (622) with values for the application characteristics (606) indicating that the size of the results is relatively small compared to the size of the next task (210*b*) and with values for the current network characteristics (608) indicating that the network currently has very little traffic congestion. Similarly, the determination ruleset may associate a determination to transfer the results (602) to the next compute node (622) with values for the application characteristics (606) indicating that the size of the results is relatively large compared to the size of the next task (210*b*) and with values for the current network characteristics (608) indicating that the network currently has very little traffic congestion. In such a manner, the determination ruleset specifies that when the size of the results (602) is small compared to the size of the next task (210*b*) and when network traffic is light, the overall application execution is enhanced by transferring the results (602) through the network to the next compute node (622) where the next task (210*b*) is deployed rather than bringing the next task (210*b*) to the current compute node (620) for execution where the results (620) are stored. Similarly, such a determination ruleset specifies that when the size of the results (602) is large compared to the size of the next task (210*b*) and when network traffic is light, the overall application execution is enhanced by bringing the next task (210*b*) to the current compute node (620) for execution where the results (620) are stored rather than transferring the results (602) through the network to the next compute node (622) where the next task (210*b*) is deployed.

The application characteristics (606) of FIG. 6 are indicators that describe aspects of an application. As already mentioned above, the application characteristics (606) of FIG. 6 may describe the task size for each task of the application, the data size for the results produced by each task of the application. The current compute node (620) may compare the task size for each task of the application and the data size for the results produced by each task of the application when determining (604) whether to transfer the results (602) to the next compute node (622) or to execute the next task (210*b*) on the current compute node (620).

In addition, the application characteristics (606) of FIG. 6 may also describe application execution optimization characteristics or any other aspects of the application as will occur to those of skill in the art. Application execution optimization characteristics are indictors relating to the manner in which a compute node may have optimized a particular task for execution on a compute node. For example, when a task is implemented using Java and executed using a Java Virtual Machine, an application execution optimization characteristics may specify that the code for the next task is already jitted on the next compute node. Jitted code refers to computer program instructions that are compiled into machine language immediately prior to execution—that is, just-in-time for execution. Accordingly, a compute node may take such application execution optimizations into account when determining (604) whether to transfer the results (602) to the next compute node (622) or to execute the next task (210*b*) on the current compute node (620) to ensure that the size of the next task (210*b*) is larger than the size of the results (602) by a sufficient margin to warrant forgoing the efficiencies of the optimizations gained by processing the results (602) using the next task (210*a*) on the next compute node (622). Readers will note that the current compute node (620) may receives the application characteristics (606) directly from the compute nodes processing the tasks carrying out the application, from a third-party application responsible for application management, or in any other manner as will occur to those of skill in the art.

The current network characteristics (608) of FIG. 6 are indicators that describe aspects of compute nodes executing the tasks or the data communications network connecting the compute nodes together. The current network characteristics (608) of FIG. 6 include network utilization information. Network utilization information describes aspects of the data communications network connecting the compute nodes together for data communications. For example, the network utilization information may describe network traffic through different links of the data communications network. The current network characteristics (608) of FIG. 6 may also include computing environment characteristics for the compute nodes within the data communications network. Computing environment characteristics describe aspects of the computing environment provided by a compute node. For example, computing environment characteristics for a compute node may describe the manner in which a compute node handles memory caching, paging, other memory management processing, and so on. Accordingly, a compute node may take such current network characteristics into account when determining (604) whether to transfer the results (602) to the next compute node (622) or to execute the next task (210*b*) on the current compute node (620) because, based on certain network characteristics, some of the application characteristics (606) may be given more weight in the determination than some of the other application characteristics (606). For example, when the network is heavily congested, the relative size of the results (602) compared to the next task (210*b*) may be more important in the determination (604) than the application execution optimizations. Readers will note that the current compute node (620) may receive the current network characteristics (608) directly from the compute nodes processing the tasks carrying out the application, from a third-party service application responsible for managing the compute node, or in any other manner as will occur to those of skill in the art.

The method of FIG. 6 includes transferring (610), by the current compute node (620), the results (602) to the next compute node (622) for further processing by the next task (210b) on the next compute node (622) if the determination specifies transferring the results (602) to the next compute node (622). The current compute node (620) may transfer (610) the results (602) to the next compute node (622) for further processing by the next task (210b) on the next compute node (622) according to embodiments of the present invention by encapsulating the results (602) in network packets and transmitting the network packets to the next node (622). The current compute node (620) may identify the next node (622) from an application configuration file provided to the current node (620) when the current task (210a) was initially deployed on the current node (620) by a service application.

The method of FIG. 6 also includes executing (612), by the current compute node (620), the next task (210b) for further processing of the results (602) if the determination specifies executing the next task (210b) on the current compute node (620). The current compute node (620) may execute (612) the next task (210b) for further processing of the results (602) according to the method of FIG. 6 by retrieving the next task (210b) from the next node (622) and scheduling the next task (210b) for processing on the current compute node's processor. The current compute node (620) may retrieve the next task (210b) from the next node (622) by sending the next node (622) a migration request that prompts the next compute node (622) to packetize the next task (210b) and transmit the packets through the network to the current node (620). In some other embodiments, the current compute node (620) may retrieve the next task (210b) from the next node (622) by sending a service application the migration request. The service application then in turn instructs the next compute node (622) to packetize the next task (210b) and transmit the packets through the network to the current node (620).

Readers will note that executing an application according to the exemplary method described above allows the determination of whether to move the data through the network to the compute nodes on which the tasks are deployed or whether to move the tasks through the network to the compute nodes where the data is stored to be made at runtime. In addition, the decision is influenced by both characteristics of the application and characteristics of the network so that as those factors change, different decisions may be made while executing the application. Making such a determination at runtime enhances overall execution of the application based on real-time information regarding the application, the compute nodes, and the network.

Exemplary embodiments of the present invention are described largely in the context of a fully functional computer system for executing an application on a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of executing an application on a parallel computer, the parallel computer comprising a plurality of compute nodes connected together through a data communications network, the application carried out by a plurality of tasks, the method comprising:

executing, by a current compute node, a current task of the application, including producing results;

determining, by the current compute node in dependence upon current network characteristics and application characteristics, whether to transfer the results to a next compute node for further processing by a next task on the next compute node or to execute the next task for further processing of the results on the current compute node;

transferring, by the current compute node, the results to the next compute node for further processing by the next task on the next compute node if the determination specifies transferring the results to the next compute node; and executing, by the current compute node, the next task for further processing of the results if the determination specifies executing the next task on the current compute node.

2. The method of claim 1 wherein the current network characteristics further comprise network utilization information.

3. The method of claim 1 wherein the current network characteristics further comprise computing environment characteristics for the compute nodes.

4. The method of claim 1 wherein the application characteristics further comprise task size for each task of the application.

5. The method of claim 1 wherein the application characteristics further comprise data size for the results produced by each task of the application.

6. The method of claim 1 wherein the application characteristics further comprise application execution optimizations.

7. A parallel computer capable of executing an application, the parallel computer comprising a plurality of compute nodes connected together through a data communications network, the application carried out by a plurality of tasks, the parallel computer comprising a plurality of computer processors and computer memory operatively coupled to the computer processors, the computer memory having disposed within it computer program instructions capable of:

executing, by a current compute node, a current task of the application, including producing results;

determining, by the current compute node in dependence upon current network characteristics and application characteristics, whether to transfer the results to a next compute node for further processing by a next task on the next compute node or to execute the next task for further processing of the results on the current compute node;

transferring, by the current compute node, the results to the next compute node for further processing by the next task on the next compute node if the determination specifies transferring the results to the next compute node; and executing, by the current compute node, the next task for further processing of the results if the determination specifies executing the next task on the current compute node.

8. The parallel computer of claim 7 wherein the current network characteristics further comprise network utilization information.

9. The parallel computer of claim 7 wherein the current network characteristics further comprise computing environment characteristics for the compute nodes.

10. The parallel computer of claim 7 wherein the application characteristics further comprise task size for each task of the application.

11. The parallel computer of claim 7 wherein the application characteristics further comprise data size for the results produced by each task of the application.

12. The parallel computer of claim 7 wherein the application characteristics further comprise application execution optimizations.

13. A computer program product for executing an application on a parallel computer, the parallel computer comprising a plurality of compute nodes connected together through a data communications network, the application carried out by a plurality of tasks, the computer program product disposed upon a computer readable medium, wherein the computer readable medium is not a signal and the computer program product comprising computer program instructions capable of:

executing, by a current compute node, a current task of the application, including producing results;

determining, by the current compute node in dependence upon current network characteristics and application characteristics, whether to transfer the results to a next compute node for further processing by a next task on the next compute node or to execute the next task for further processing of the results on the current compute node;

transferring, by the current compute node, the results to the next compute node for further processing by the next task on the next compute node if the determination specifies transferring the results to the next compute node; and executing, by the current compute node, the next task for further processing of the results if the determination specifies executing the next task on the current compute node.

14. The computer program product of claim 13 wherein the current network characteristics further comprise network utilization information.

15. The computer program product of claim 13 wherein the current network characteristics further comprise computing environment characteristics for the compute nodes.

16. The computer program product of claim 13 wherein the application characteristics further comprise task size for each task of the application.

17. The computer program product of claim 13 wherein the application characteristics further comprise data size for the results produced by each task of the application.

18. The computer program product of claim 13 wherein the application characteristics further comprise application execution optimizations.

* * * * *